United States Patent
Li et al.

(10) Patent No.: US 9,877,304 B2
(45) Date of Patent: Jan. 23, 2018

(54) BROADCAST MESSAGE TRANSMISSION METHOD, BASE STATION AND USER EQUIPMENT

(71) Applicant: Huawei Technologies Co., Ltd., Shenzhen (CN)

(72) Inventors: Yuanjie Li, Shenzhen (CN); Zhenfei Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 14/667,019

(22) Filed: Mar. 24, 2015

(65) Prior Publication Data

US 2015/0195814 A1    Jul. 9, 2015

Related U.S. Application Data

(63) Continuation of application No. PCT/CN2012/081858, filed on Sep. 24, 2012.

(51) Int. Cl.
*H04W 4/00* (2009.01)
*H04W 72/00* (2009.01)
(Continued)

(52) U.S. Cl.
CPC ......... *H04W 72/005* (2013.01); *H04L 5/0053* (2013.01); *H04W 72/0453* (2013.01); *H04L 5/0051* (2013.01); *H04L 5/0073* (2013.01)

(58) Field of Classification Search
CPC .............................. H04W 72/00; H04W 72/04
(Continued)

(56) References Cited

U.S. PATENT DOCUMENTS 9,332,516 B2 *  5/2016  Blankenship ..... H04W 56/0015
2007/0201350 A1 *  8/2007  Papasakellariou ...... H04L 5/023
370/208
(Continued)

FOREIGN PATENT DOCUMENTS

CN     101868950 A    10/2010
CN     101959240 A    1/2011
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.5.0, Jun. 2012, 101 pages.
(Continued)

*Primary Examiner* — Farah Faroul
(74) *Attorney, Agent, or Firm* — Brinks Gilson & Lione

(57) ABSTRACT

The present invention provides a broadcast message transmission method, a base station and user equipment. The method includes: determining a resource position of a broadcast channel, wherein the broadcast channel occupies M physical resource blocks (PRBs) among m PRBs of a frequency band center of a carrier, m and M are positive integers, M is not greater than m, and m is not greater than the number of the PRBs corresponding to the system bandwidth; mapping the broadcast channel on the resource position; and sending a broadcast message through the broadcast channel. In the embodiments of the present invention, since the broadcast channel occupies M PRBs among m PRBs of a frequency band center of a carrier, by mapping the broadcast channel on the resource position and sending a broadcast message through the broadcast channel, the resource utilization rate of the carrier may be improved.

11 Claims, 3 Drawing Sheets

(51) Int. Cl.
*H04W 72/04* (2009.01)
*H04L 5/00* (2006.01)

(58) Field of Classification Search
USPC .......................................................... 370/329
See application file for complete search history.

(56) References Cited

U.S. PATENT DOCUMENTS

| | | | |
|---|---|---|---|
| 2009/0249027 A1* | 10/2009 | Kim ................. | H04L 25/03866 712/5 |
| 2009/0303950 A1* | 12/2009 | Ofuji ..................... | H04L 5/0007 370/329 |
| 2010/0110994 A1* | 5/2010 | Ratsuk .................. | H04B 1/713 370/329 |
| 2010/0184447 A1* | 7/2010 | Miki ..................... | H04L 5/0007 455/450 |
| 2012/0198305 A1 | 8/2012 | Abu-Surra et al. | |
| 2013/0044678 A1* | 2/2013 | Qu ..................... | H04W 52/244 370/328 |
| 2013/0176978 A1* | 7/2013 | Abe ..................... | H04W 72/04 370/329 |
| 2013/0235837 A1 | 9/2013 | Suo et al. | |
| 2013/0343318 A1* | 12/2013 | Gruet ..................... | H04L 5/001 370/329 |
| 2014/0349664 A1* | 11/2014 | Pedersen ................ | H04L 5/001 455/450 |
| 2014/0355493 A1* | 12/2014 | Niu ..................... | H04L 12/189 370/280 |
| 2015/0341908 A1* | 11/2015 | Wang .................. | H04W 72/02 370/312 |

FOREIGN PATENT DOCUMENTS

| | | |
|---|---|---|
| CN | 102438314 A | 5/2012 |
| CN | 102469467 A | 5/2012 |
| EP | 2 169 865 A1 | 3/2010 |
| EP | 2 571 221 A1 | 3/2013 |
| WO | WO 2011/006419 A1 | 1/2011 |
| WO | WO 2012/115800 A1 | 8/2012 |

OTHER PUBLICATIONS

Catt et al., "DRS Collision," Change Request Form, 3GPP TSG-RAN WG1 Meeting #55, Prague, Czech Republic, R1-084283, Nov. 2008, 4 pages.

Ericsson et al., "Draft CR 36.211 Introduction of LTE Positioning," 3GPP TSG-RAN WG1 Meeting #57bis, Los Angeles, USA, R1-092854, Jul. 2009, 4 pages.

Jiang, Dajie et al., "Frequency Shifted Frequency Reuse for LTE Heterogeneous Networks," IEEE, 2011, 5 pages.

LG Electronics, " Consideration on DCI Mapping for EPDCCH," 3GPP TSG RAN WG1 Meeting #70, Qingdao, China, R1-123526, Aug. 2012, 7 pages.

European Patent Office, First Office Action from EP Application No. 12 884 784.5 dated Aug. 10, 2017, 7 pages.

Motorola, P-BCH Design, 3GPP Draft; R1-072665—P-BCH, $3^{rd}$ Generation Partnership Project (3GPP), Mobile Competence Centre; 650, Route Des Lucioles; F-06921 Sophia-Antipolis Cedex; France, vol. RAN WG1, No. Orlando, USA; dated Jun. 20, 2007, 8 pages.

* cited by examiner

BROADCAST MESSAGE TRANSMISSION METHOD, BASE STATION AND USER EQUIPMENT

CROSS-REFERENCE TO RELATED APPLICATIONS

This application is a continuation of International Application No. PCT/CN2012/081858 filed on Sep. 24, 2012, which is hereby incorporated by reference in its entirety.

TECHNICAL FIELD

The present invention relates to the field of communications, and particularly, to a broadcast message transmission method, a base station and user equipment.

BACKGROUND

In the existing wireless communication systems, for example, a long term evolution (Long Term Evolution, LTE) system, a physical broadcast channel (Physical Broadcast Channel, PBCH) may bear a broadcast message of a cell, for example, a downlink system bandwidth, the number of transmitting antennas and a system frame number, etc. The PBCH generally occupies 6 resource blocks (Resource Block, RB) at the middle of the system bandwidth on frequency domain and occupies the orthogonal frequency division multiplexing (Orthogonal Frequency Division Multiplexing, OFDM) symbols 0, 1, 2 and 3 in the second time slot of a sub-frame on time domain.

With the continuous development of wireless communication technology, different types of carriers are introduced, for example, new carrier type (New Carrier Type, NCT) carriers introduced in the LTE release (Release) 11, and are independent of the traditional carrier, channels used for transmitting the broadcast message need to be arranged on these carriers, but since the resource mapping of physical channels born on different types of carriers may be different, if the PBCH adopts the existing distribution manner, low resource utilization rate of the carriers is induced easily.

SUMMARY

Embodiments of the present invention provide a broadcast message transmission method, a base station and user equipment, which may be used for improving the resource utilization rate of carriers.

In the first aspect, a broadcast message transmission method is provided, including: determining a resource position of a broadcast channel, wherein the broadcast channel occupies M physical resource blocks (PRBs) among m PRBs of a frequency band center of a carrier, m and M are positive integers, M is not greater than m, and m is not greater than the number of the PRBs corresponding to the system bandwidth; mapping the broadcast channel on the resource position; and sending a broadcast message through the broadcast channel.

In combination with the first aspect, in the first possible implementation manner, the determining a resource position of a broadcast channel, includes: determining the positions of the M PRBs according to the position information of the broadcast channel, wherein the position information includes a cell identifier.

In combination with the first possible implementation manner of the first aspect, in the second possible implementation manner, the position information further includes an interval $s_i$ between the $(i+1)^{th}$ PRB and the $i^{th}$ PRB among the M PRBs, wherein i is a positive integer, and i is not smaller than 1 and is not greater than M−1;

the determining the positions of the M PRBs according to the position information of the broadcast channel, includes:
determining the position $N_1$ of the first PRB among the M PRBs according to the cell identifier; and
determining the position $N_{i+1}$ of the $(i+1)^{th}$ PRB according to an equation $N_{i+1}=N_i+s_i$, in accordance with the position $N_1$ of the first PRB and the interval $s_i$, wherein $N_i$ is the position of the $i^{th}$ PRB.

In combination with the first possible implementation manner of the first aspect, in the third possible implementation manner, the position information further includes an interval $s_i$ between the $(i+1)^{th}$ PRB and the $i^{th}$ PRB among the M PRBs, a system bandwidth $N_{RB}^{DL}$ and the number $N_{sc}^{RB}$ of subcarriers contained in one PRB, wherein i is a positive integer, and i is not smaller than 1 and is not greater than M−1;

the determining the positions of the M PRBs according to the position information of the broadcast channel, includes:
determining the position $N_1$ of the first PRB among the M PRBs according to the cell identifier; and
determining the initial position of the subcarrier of each PRB among the M PRBs according to the position $N_1$ of the first PRB, the interval $s_i$, the system bandwidth $N_{RB}^{DL}$ and the number $N_{sc}^{RB}$ of subcarriers contained in one PRB.

In combination with the third possible implementation manner of the first aspect, in the fourth possible implementation manner, the intervals between the M PRBs are equal; determine the initial position of the subcarrier of each PRB among the M PRBs according to the following equation:

$$k_{PRB,j} = \frac{N_{RB}^{DL} N_{sc}^{RB}}{2} - 36 + [(N_1 + (j-1)d) \cdot N_{sc}^{RB}],$$

$$j = 1, \ldots, M \text{ or,}$$

$$k_{PRB,j} = \frac{N_{RB}^{DL} N_{sc}^{RB}}{2} - 36 + [(N_1 + (j-1)d) \cdot N_{sc}^{RB}] \bmod 36,$$

$$j = 1, \ldots, M$$

wherein, $d=s_i$, $k_{PRB,j}$ represents the initial position of the subcarrier of the $j^{th}$ PRB among the M PRBs.

In combination with the third possible implementation manner of the first aspect, in the fifth possible implementation manner, the intervals between the M PRBs are different; determine the initial position of the subcarrier of each PRB among the M PRBs according to the following equation:

$$k_{PRB,1} = \frac{N_{RB}^{DL} N_{sc}^{RB}}{2} - 36 + N_1 \cdot N_{sc}^{RB},$$

$$k_{PRB,j} = \frac{N_{RB}^{DL} N_{sc}^{RB}}{2} - 36 + \left(N_1 + \sum_{i=1}^{j-1} s_i\right) \cdot N_{sc}^{RB},$$

$$j = 2, \ldots, M; \text{ or,}$$

$$k_{PRB,1} = \frac{N_{RB}^{DL} N_{sc}^{RB}}{2} - 36 + N_1 \cdot N_{sc}^{RB},$$

$$k_{PRB,j} = \frac{N_{RB}^{DL} N_{sc}^{RB}}{2} - 36 + \left[\left(N_1 + \sum_{i=1}^{j-1} s_i\right) \cdot N_{sc}^{RB}\right] \bmod 36,$$

$$j = 2, \ldots, M$$

wherein, $k_{PRB,1}$ represents the initial position of the subcarrier of the first PRB among the M PRBs, and $k_{PRB,j}$ represents the initial position of the subcarrier of the $j^{th}$ PRB among the M PRBs.

In combination with the second possible implementation manner of the first aspect, the third possible implementation manner of the first aspect, the fourth possible implementation manner of the first aspect or the fifth possible implementation manner of the first aspect, in the sixth possible implementation manner, the determining the position $N_1$ of the first PRB among the M PRBs according to the cell identifier, includes: acquiring a frequency domain offset value between the position $N_1$ of the first PRB among the M PRBs in the current sub-frame and the position of the first PRB occupied by the broadcast channel of the first sub-frame; determining the position of the first PRB occupied by the broadcast channel of the first sub-frame according to the cell identifier; and determining the position $N_1$ of the first PRB among the M PRBs in the current sub-frame according to the frequency domain offset value and the position of the first PRB occupied by the broadcast channel of the first sub-frame.

In combination with the sixth possible implementation manner of the first aspect, in the seventh possible implementation manner, the acquiring a frequency domain offset value between the position $N_1$ of the first PRB among the M PRBs in the current sub-frame and the position of the first PRB occupied by the broadcast channel of the first sub-frame, includes: acquiring the frequency domain offset value from the position information, wherein the position information further includes the frequency domain offset value; or, determining the frequency domain offset value according to the cell identifier.

In combination with the first aspect, in the eighth possible implementation manner, the determining the position of a broadcast channel, includes: acquiring the positions of the M PRBs from the position information of the broadcast channel, wherein the position information includes the positions of the M PRBs.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect or the eighth possible implementation manner of the first aspect, in the ninth possible implementation manner, the mapping the broadcast channel on the resource position, includes: adopting a mapping manner matched with a demodulation reference signal (DMRS) rate to map the broadcast channel in the M PRBs according to a sequence of first frequency domain and then time domain or a sequence of first time domain and then frequency domain.

In combination with the ninth possible implementation manner of the first aspect, in the tenth possible implementation manner, the mapping the broadcast channel in M PRBs, includes: mapping the broadcast channel and a pilot carrier in each PRB among the M PRBs, wherein the pilot carrier does not include channel-state information reference signal (CSI-RS), common reference signal (CRS) or position reference signal (PRS).

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect or the tenth possible implementation manner of the first aspect, in the eleventh possible implementation manner, the sending a broadcast message through the broadcast channel, includes: dividing REs mapping the broadcast channel into n groups of REs in any PRB among the M PRBs, wherein n is a positive integer; respectively mapping the n groups of REs on n antenna ports corresponding to n DMRSs; and sending the broadcast message from the n antenna ports.

In combination with the eleventh possible implementation manner of the first aspect, in the twelfth possible implementation manner, the sending a broadcast message through the broadcast channel, includes: sending the broadcast message from the n antenna ports in a random beam forming manner with order of 1.

In combination with the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, the seventh possible implementation manner of the first aspect, the eighth possible implementation manner of the first aspect, the ninth possible implementation manner of the first aspect, the tenth possible implementation manner of the first aspect, the eleventh possible implementation manner of the first aspect or the twelfth possible implementation manner of the first aspect, in the thirteenth possible implementation manner, the carrier is a new carrier type NCT carrier.

In the second aspect, a broadcast message transmission method is provided, including: determining a resource position of a broadcast channel, wherein the broadcast channel occupies M physical resource blocks (PRBs) among m PRBs of a frequency band center of a carrier, m and M are positive integers, M is not greater than m, and m is not greater than the number of the PRBs corresponding to the system bandwidth; and receiving a broadcast message sent by a base station through the broadcast channel on the resource position of the broadcast channel.

In combination with the second aspect, in the first possible implementation manner, the determining the resource position of a broadcast channel, includes: determining the positions of the M PRBs according to the position information of the broadcast channel, wherein the position information includes a cell identifier.

In combination with the first possible implementation manner of the second aspect, in the second possible implementation manner, the position information further includes an interval $s_i$ between the $(i+1)^{th}$ PRB and the $i^{th}$ PRB among the M PRBs, wherein i is a positive integer, and i is not smaller than 1 and is not greater than M−1;

the determining the positions of the M PRBs according to the position information of the broadcast channel, includes: determining the position $N_1$ of the first PRB among the M PRBs according to the cell identifier; and determining the position $N_{i+1}$ of the $(i+1)^{th}$ PRB according to an equation $N_{i+1}=N_i+s_i$, in accordance with the position $N_1$ of the first PRB and the interval $s_i$, wherein $N_i$ is the position of the $i^{th}$ PRB.

In combination with the first possible implementation manner of the second aspect, in the third possible implementation manner, the position information further includes an interval $s_i$ between the $(i+1)^{th}$ PRB and the $i^{th}$ PRB among the M PRBs, a system bandwidth $N_{RB}^{DL}$ and the number $N_{sd}^{RB}$ of subcarriers contained in one PRB;

the determining the positions of the M PRBs according to the position information of the broadcast channel, includes:

determining the position $N_1$ of the first PRB among the M PRBs according to the cell identifier; and determining the initial position of the subcarrier of each PRB among the M PRBs according to the position $N_1$ of the first PRB, the interval $s_i$, the system bandwidth $N_{RB}^{DL}$ and the number $N_{sc}^{DL}$ of subcarriers contained in one PRB.

In combination with the third possible implementation manner of the second aspect, in the fourth possible implementation manner, the intervals between the M PRBs are equal;

determine the initial position of the subcarrier of each PRB among the M PRBs according to the following equation:

$$k_{PRB,j} = \frac{N_{RB}^{DL} N_{sc}^{RB}}{2} - 36 + [(N_1 + (j-1)d) \cdot N_{sc}^{RB}],$$

$$j = 1, \ldots, M \text{ or,}$$

$$k_{PRB,j} = \frac{N_{RB}^{DL} N_{sc}^{RB}}{2} - 36 + [(N_1 + (j-1)d) \cdot N_{sc}^{RB}] \mod 36,$$

$$j = 1, \ldots, M$$

wherein, $d=s_i$, $k_{PRB,j}$ represents the initial position of the subcarrier of the $j^{th}$ PRB among the M PRBs.

In combination with the third possible implementation manner of the second aspect, in the fifth possible implementation manner, the intervals between the M PRBs are different;

determine the initial position of the subcarrier of each PRB among the M PRBs according to the following equation:

$$k_{PRB,1} = \frac{N_{RB}^{DL} N_{sc}^{RB}}{2} - 36 + N_1 \cdot N_{sc}^{RB},$$

$$k_{PRB,j} = \frac{N_{RB}^{DL} N_{sc}^{RB}}{2} - 36 + \left(N_1 + \sum_{i=1}^{j-1} s_i\right) \cdot N_{sc}^{RB},$$

$$j = 2, \ldots, M; \text{ or,}$$

$$k_{PRB,1} = \frac{N_{RB}^{DL} N_{sc}^{RB}}{2} - 36 + N_1 \cdot N_{sc}^{RB},$$

$$k_{PRB,j} = \frac{N_{RB}^{DL} N_{sc}^{RB}}{2} - 36 + \left[\left(N_1 + \sum_{i=1}^{j-1} s_i\right) \cdot N_{sc}^{RB}\right] \mod 36,$$

$$j = 2, \ldots, M$$

wherein, $k_{PRB,1}$ represents the initial position of the subcarrier of the first PRB among the M PRBs, and $k_{PRB,j}$ represents the initial position of the subcarrier of the $j^{th}$ PRB among the M PRBs.

In combination with the first possible implementation manner of the second aspect, in the sixth possible implementation manner, the determining the position $N_1$ of the first PRB among the M PRBs according to the cell identifier, includes: acquiring a frequency domain offset value between the position $N_1$ of the first PRB among the M PRBs in the current sub-frame and the position of the first PRB occupied by the broadcast channel of the first sub-frame; determining the position of the first PRB occupied by the broadcast channel of the first sub-frame according to the cell identifier; and determining the position $N_1$ of the first PRB among the M PRBs in the current sub-frame according to the frequency domain offset value and the position of the first PRB occupied by the broadcast channel of the first sub-frame.

In combination with the sixth possible implementation manner of the second aspect, in the seventh possible implementation manner, the acquiring a frequency domain offset value between the position $N_1$ of the first PRB among the M PRBs in the current sub-frame and the position of the first PRB occupied by the broadcast channel of the first sub-frame, includes: acquiring the frequency domain offset value from the position information, wherein the position information further includes the frequency domain offset value; or, determining the frequency domain offset value according to the cell identifier.

In combination with the second aspect, in the eighth possible implementation manner, the determining the resource position of a broadcast channel, includes: acquiring the positions of the M PRBs from the position information of the broadcast channel, wherein the position information includes the positions of the M PRBs.

In combination with the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect or the eighth possible implementation manner of the second aspect, in the ninth possible implementation manner, the receiving a broadcast message sent by a base station through the broadcast channel on the resource position of the broadcast channel, includes: receiving the broadcast message sent by the base station through the broadcast channel on the M PRBs, wherein each PRB among the M PRBs is used by the base station for mapping the broadcast channel and a pilot carrier, wherein the pilot carrier does not include channel-state information reference signal (CSI-RS), common reference signal (CRS) or position reference signal (PRS).

In combination with the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, the seventh possible implementation manner of the second aspect, the eighth possible implementation manner of the second aspect or the ninth possible implementation manner of the second aspect, in the tenth possible implementation manner, the carrier is a new carrier type NCT carrier.

In the third aspect, a base station is provided, including: a determining unit, configured to determine a resource position of a broadcast channel, wherein the broadcast channel occupies M physical resource blocks (PRBs) among m PRBs of a frequency band center of a carrier, m and M are positive integers, M is not greater than m, and m is not greater than the number of the PRBs corresponding to the system bandwidth; a mapping unit, configured to map the broadcast channel on the resource position; and a sending unit, configured to send a broadcast message through the broadcast channel.

In combination with the third aspect, in the first possible implementation manner, the determining unit is specifically configured to determine the positions of the M PRBs according to the position information of the broadcast channel, wherein the position information includes a cell identifier.

In combination with the first possible implementation manner of the third aspect, in the second possible implementation manner, the position information further includes an interval $s_i$ between the $(i+1)^{th}$ PRB and the $i^{th}$ PRB among the M PRBs, wherein i is a positive integer, and i is not smaller than 1 and is not greater than M−1;

the determining unit is specifically configured to determine the position $N_1$ of the first PRB among the M PRBs according to the cell identifier, and determine the position $N_{i+1}$ of the $(i+1)^{th}$ PRB according to an equation $N_{i+1}=N_i+s_i$, in accordance with the position $N_1$ of the first PRB and the interval $s_i$, wherein $N_i$ is the position of the $i^{th}$ PRB.

In combination with the first possible implementation manner of the third aspect, in the third possible implementation manner, the position information further includes an interval $s_i$ between the $(i+1)^{th}$ PRB and the $i^{th}$ PRB among the M PRBs, a system bandwidth $N_{RB}^{DL}$ and the number $N_{sc}^{RB}$ of subcarriers contained in one PRB, wherein i is a positive integer, and i is not smaller than 1 and is not greater than M−1;

the determining unit is specifically configured to determine the position $N_1$ of the first PRB among the M PRBs according to the cell identifier, and determine the initial position of the subcarrier of each PRB among the M PRBs according to the position $N_1$ of the first PRB, the interval $s_i$, the system bandwidth $N_{RB}^{LD}$ and the number $N_{sc}^{RB}$ of subcarriers contained in one PRB, and determine the initial position of the subcarrier of each PRB among the M PRBs.

In combination with the second possible implementation manner of the third aspect or the third possible implementation manner of the third aspect, in the fourth possible implementation manner, the determining unit is specifically configured to acquire a frequency domain offset value between the position $N_1$ of the first PRB among the M PRBs in the current sub-frame and the position of the first PRB occupied by the broadcast channel of the first sub-frame; determine the position of the first PRB occupied by the broadcast channel of the first sub-frame according to the cell identifier; and determine the position $N_1$ of the first PRB among the M PRBs in the current sub-frame according to the frequency domain offset value and the position of the first PRB occupied by the broadcast channel of the first sub-frame.

In combination with the fourth possible implementation manner of the third aspect, in the fifth possible implementation manner, the determining unit is specifically configured to acquire the frequency domain offset value from the position information, wherein the position information further includes the frequency domain offset value; or, determine the frequency domain offset value according to the cell identifier.

In combination with the third aspect, in the sixth possible implementation manner, the determining unit is specifically configured to acquire the positions of the M PRBs from the position information of the broadcast channel, wherein the position information includes the positions of the M PRBs.

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect or the sixth possible implementation manner of the third aspect, in the seventh possible implementation manner, the mapping unit is specifically configured to adopt a mapping manner matched with a demodulation reference signal (DMRS) rate to map the broadcast channel in the M PRBs according to a sequence of first frequency domain and then time domain or a sequence of first time domain and then frequency domain.

In combination with the seventh possible implementation manner of the third aspect, in the eighth possible implementation manner, the mapping unit is specifically configured to map the broadcast channel and a pilot carrier in each PRB among the M PRBs, wherein the pilot carrier does not include channel-state information reference signal (CSI-RS), common reference signal (CRS) or position reference signal (PRS).

In combination with the third aspect, the first possible implementation manner of the third aspect, the second possible implementation manner of the third aspect, the third possible implementation manner of the third aspect, the fourth possible implementation manner of the third aspect, the fifth possible implementation manner of the third aspect, the sixth possible implementation manner of the third aspect, the seventh possible implementation manner of the third aspect or the eighth possible implementation manner of the third aspect, in the ninth possible implementation manner, the mapping unit is further configured to divide REs mapping the broadcast channel into n groups of REs in any PRB among the M PRBs, wherein n is a positive integer; respectively map the n groups of REs on n antenna ports corresponding to n DMRSs; the sending unit is specifically configured to send the broadcast message from the n antenna ports.

In combination with the ninth possible implementation manner of the third aspect, in the tenth possible implementation manner, the sending unit is specifically configured to send the broadcast message from the n antenna ports in a random beam forming manner with order of 1.

In the fourth aspect, user equipment is provided, including: a determining unit, configured to determine a resource position of a broadcast channel, wherein the broadcast channel occupies M physical resource blocks (PRBs) among m PRBs of a frequency band center of a carrier, m and M are positive integers, M is not greater than m, and m is not greater than the number of the PRBs corresponding to the system bandwidth; and a receiving unit, configured to receive a broadcast message sent by a base station through the broadcast channel.

In combination with the fourth aspect, in the first possible implementation manner, the determining unit is specifically configured to determine the positions of the M PRBs according to the position information of the broadcast channel, wherein the position information includes a cell identifier.

In combination with the first possible implementation manner of the fourth aspect, in the second possible implementation manner, the position information further includes an interval $s_i$ between the $(i+1)^{th}$ PRB and the $i^{th}$ PRB among the M PRBs, wherein i is a positive integer, and i is not smaller than 1 and is not greater than M−1;

the determining unit is specifically configured to determine the position $N_1$ of the first PRB among the M PRBs according to the cell identifier, and determine the position $N_{i+1}$ of the $(i+1)^{th}$ PRB according to an equation $N_{i+1}=N_i+s_i$, in accordance with the position $N_1$ of the first PRB and the interval $s_i$, wherein $N_i$ is the position of the $i^{th}$ PRB.

In combination with the first possible implementation manner of the fourth aspect, in the third possible implementation manner, the position information further includes an interval $s_i$ between the $(i+1)^{th}$ PRB and the $i^{th}$ PRB among the M PRBs, a system bandwidth $N_{RB}^{DL}$ and the number $N_{sc}^{RB}$ of subcarriers contained in one PRB;

the determining unit is specifically configured to determine the position $N_1$ of the first PRB among the M PRBs according to the cell identifier, and determine the initial position of the subcarrier of each PRB among the M PRBs according to the position $N_1$ of the first PRB, the interval $s_i$, the system bandwidth $N_{RB}^{DL}$ and the number $N_{sc}^{RB}$ of subcarriers contained in one PRB.

In combination with the second possible implementation manner of the fourth aspect or the third possible implementation manner of the fourth aspect, in the fourth possible implementation manner, the determining unit is specifically configured to acquire a frequency domain offset value between the position $N_1$ of the first PRB among the M PRBs in the current sub-frame and the position of the first PRB occupied by the broadcast channel of the first sub-frame; determine the position of the first PRB occupied by the broadcast channel of the first sub-frame according to the cell identifier; and determine the position $N_1$ of the first PRB among the M PRBs in the current sub-frame according to the frequency domain offset value and the position of the first PRB occupied by the broadcast channel of the first sub-frame.

In combination with the fourth possible implementation manner of the fourth aspect, in the fifth possible implementation manner, the determining unit is specifically configured to acquire the frequency domain offset value from the position information, wherein the position information further includes the frequency domain offset value; or, determine the frequency domain offset value according to the cell identifier.

In combination with the fourth aspect, in the sixth possible implementation manner, the determining unit is specifically configured to acquire the positions of the M PRBs from the position information of the broadcast channel, wherein the position information includes the positions of the M PRBs.

In the embodiments of the present invention, since the broadcast channel occupies M PRBs among m PRBs of a frequency band center of a carrier, by mapping the broadcast channel on the resource position and sending a broadcast message through the broadcast channel, the resource utilization rate of the carrier may be improved.

BRIEF DESCRIPTION OF DRAWINGS

To illustrate technical solutions in the embodiments of the present invention more clearly, a brief introduction on the accompanying drawings which are needed in the description of the embodiments is given below. Apparently, the accompanying drawings in the description below are merely some of the embodiments of the present invention, based on which other drawings may be obtained by those of ordinary skills in the art without any creative effort.

DESCRIPTION OF EMBODIMENTS

A clear and complete description of technical solutions in the embodiments of the present invention will be given below, in combination with the accompanying drawings in the embodiments of the present invention. Apparently, the embodiments described below are merely a part, but not all, of the embodiments of the present invention. All of the other embodiments, obtained by those of ordinary skills in the art based on the embodiments of the present invention without any creative effort, fall into the protection scope of the present invention.

The technical solutions of the present invention may be applied to various communication systems, for example: a global system of mobile communication (Global System of Mobile communication, GSM), a code division multiple access (Code Division Multiple Access, CDMA) system, a wideband code division multiple access (Wideband Code Division Multiple Access, WCDMA), general packet radio service (General Packet Radio Service, GPRS), long term evolution (Long Term Evolution, LTE) or the like.

User equipment (User Equipment, UE), also called a mobile terminal (Mobile Terminal, MT), mobile user equipment and the like, may communicate with one or multiple core networks through a radio access network (e.g., Radio Access Network, RAN), the user equipment may be a mobile terminal, for example, a mobile telephone (or called a "cellular" telephone) and a computer having a mobile terminal, for example, may be a portable, pocket, hand-held, computer inbuilt or vehicle-mounted mobile device.

A base station may be a base transceiver station (Base Transceiver Station, BTS) in GSM or CDMA, may also be a base station (NodeB) in WCDMA, and may also be an evolved base station (evolved Node B, eNB or e-NodeB) in LTE.

Figure 1:
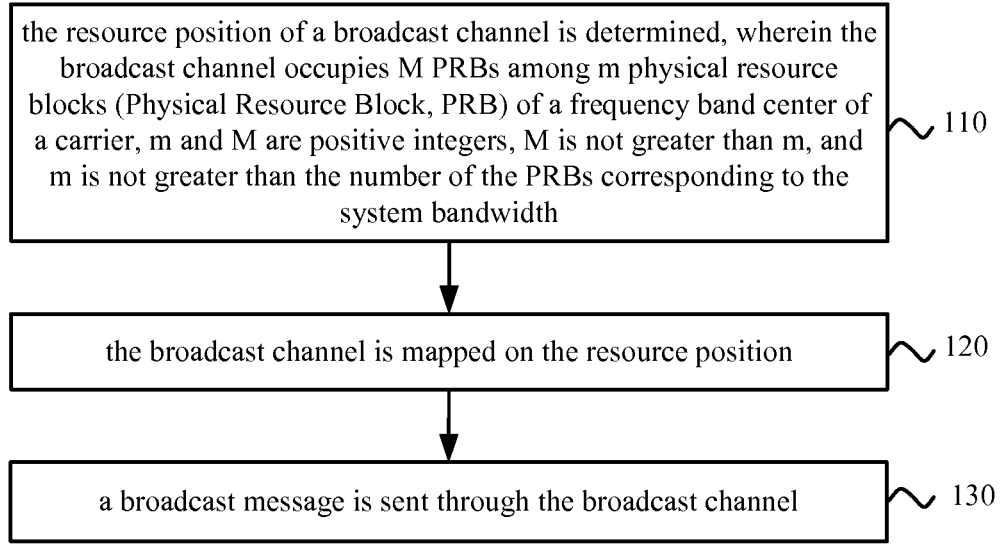
FIG. 1 is a schematic diagram of a flow of a broadcast message transmission method according to an embodiment of the present invention.

FIG. 1 is a schematic diagram of a flow of a broadcast message transmission method according to an embodiment of the present invention. The method of FIG. 1 is implemented by a base station.

110, the resource position of a broadcast channel is determined, wherein the broadcast channel occupies M PRBs among m physical resource blocks (Physical Resource Block, PRB) of a frequency band center of a carrier, m and M are positive integers, M is not greater than m, and m is not greater than the number of the PRBs corresponding to the system bandwidth.

It should be understood that, in the embodiment of the present invention, the broadcast channel may be a channel used for transmitting a broadcast message, for example, may be PBCH, may also be enhanced PBCH (enhanced-PBCH, ePBCH, EPBCH) and may also be other channels. This is not limited in the embodiments of the present invention.

Specifically, the resource position of the broadcast channel may be determined within the distribution range of the broadcast channel. Namely, the distribution range of the broadcast channel may be m PRBs of the frequency band center, and the resource position of the broadcast channel may be M PRBs among the m PRBs. The m can be any positive integer not greater than the PRB corresponding to the system bandwidth. As an example, an LTE system currently supports 6 standard bandwidths, namely, 20 MB bandwidth corresponds to 100 PRBs, 15 MB bandwidth corresponds to 75 PRBs, 10 MB bandwidth corresponds to 50 PRBs, 5 M bandwidth corresponds to 25 PRBs, 3 MB bandwidth corresponds to 10 PRBs and 1.4 MB bandwidth corresponds to 6 PRBs. The m may be the number of the PRBs corresponding to the current minimum system bandwidth supported by the LTE system, namely 6. Correspondingly, the distribution range of the broadcast channel may be 6 PRBs of the frequency band center, and the broadcast channel may occupy 1, 2, 3, 4, 5 or 6 PRBs among the 6 PRBs.

120, the broadcast channel is mapped on the resource position.

130, a broadcast message is sent through the broadcast channel.

The base station may send the broadcast message to UE through the broadcast channel.

In the prior art, PBCH occupies 6 RBs at the middle of the system bandwidth on frequency domain and occupies OFDM symbols 0, 1, 2 and 3 in the second time slot of a sub-frame on time domain, while in the embodiment of the present invention, since the broadcast channel occupies M PRBs among the m PRBs of the frequency band center of the carrier, the rest resources on the carrier may be better distributed, so that the resource utilization rate of the carrier may be improved.

In the embodiments of the present invention, since the broadcast channel occupies M PRBs among m PRBs of a frequency band center of a carrier, by mapping the broadcast channel on the resource position and sending a broadcast message through the broadcast channel, the resource utilization rate of the carrier may be improved.

Optionally, as an embodiment, in step 110, the base station may determine the positions of the M PRBs according to the position information of the broadcast channel, wherein the position information includes a cell (Cell) identifier (Identifier, ID).

The base station may pre-store the position information therein, to acquire the position information when determining the positions of the M PRBs. The position information may include a cell ID pre-allocated by the base station.

It should also be understood that, in the embodiment of the present invention, the cell ID may be a physical layer cell ID, an enhanced cell ID, a logic cell ID or a virtual cell ID or the like, and this is not limited in the embodiment of the present invention.

In the embodiment of the present invention, the positions of the M PRBs are determined according to the position information including the cell ID, and since the cell IDs of the cells are different, interference between the broadcast channels of the cells may be effectively overcome.

Optionally, as another embodiment, in step 110, the position information may further include an interval $s_i$ between the $(i+1)^{th}$ PRB and the $i^{th}$ PRB among the M PRBs, wherein i is a positive integer, and i is not smaller than 1 and is not greater than M−1. The base station may determine the position $N_1$ of the first PRB occupied by the broadcast channel according to the cell ID, and determine the position $N_1$ of the $(i+1)^{th}$ PRB according to an equation (1), in accordance with the position $N_1$ of the first PRB and the interval $s_i$.

$$N_{i+1}=N_i+s_i \qquad (1)$$

wherein, $N_i$ is the position of the $i^{th}$ PRB.

The base station may determine the position $N_1$ of the first PRB occupied by the broadcast channel according to the cell ID. For example, the position $N_1$ of the first PRB may be determined according to an equation (2) or (3), the position $N_1$ of the first PRB may also be determined according to other manners, and this is not limited in the embodiment of the present invention.

$$N_1=(\text{cell ID})\bmod m \qquad (2)$$

$$N_1=(\text{cell ID})\bmod m/M \qquad (3)$$

After determining the position $N_1$ of the first PRB occupied by the broadcast channel, the base station may determine the position of each PRB among the M PRBs according to the position $N_1$ of the first PRB and the interval between each two PRBs among the M PRBs. The interval $s_i$ between the $(i+1)^{th}$ PRB and the $i^{th}$ PRB among the M PRBs may be a position difference value between the $(i+1)^{th}$ PRB and the $i^{th}$ PRB, for example, it is assumed that the second PRB and the first PRB are adjacent, then the interval therebetween is 1. It is assumed that three PRBs exist between the second PRB and the first PRB, and then the interval between the second PRB and the first PRB is 4. The interval between the $(i+1)^{th}$ PRB and the $i^{th}$ PRB may be predefined. In this way, the base station may determine the position of $(i+1)^{th}$ PRB according to the equation (1). For example, the position of the second PRB is: $N_2=N_1+s_1$, and $s_1$ is the interval between the second PRB and the first PRB, and the like.

Optionally, as another embodiment, in step 110, the position information may further include an interval $s_i$ between the $(i+1)^{th}$ PRB and the $i^{th}$ PRB among the M PRBs, a system bandwidth $N_{RB}^{DL}$ and the number $N_{sc}^{RB}$ of sub-carriers contained in one PRB, wherein i is a positive integer, and i is not smaller than 1 and is not greater than M−1. The base station may determine the position $N_1$ of the first PRB occupied by the broadcast channel according to the cell ID, and determine the initial position of the subcarrier of each PRB among the M PRBs according to the position $N_1$ of the first PRB, the interval $s_i$, the system bandwidth $N_{RB}^{DL}$ and the number $N_{sc}^{RB}$ of subcarriers contained in one PRB.

The base station may determine the initial position of the subcarrier of each PRB among the M PRBs, namely, determining the position of each PRB.

Optionally, as another embodiment, in step 110, the intervals between the M PRBs may be equal. Then the base station may determine the initial position of the subcarrier of each PRB among the M PRBs according to an equation (4) or an equation (5), $$k_{PRB,j} = \frac{N_{RB}^{DL} N_{sc}^{RB}}{2} - 36 + [(N_1 + (j-1)d) \cdot N_{sc}^{RB}], \qquad (4)$$
$$j = 1, \ldots, M$$

$$k_{PRB,j} = \frac{N_{RB}^{DL} N_{sc}^{RB}}{2} - 36 + [(N_1 + (j-1)d) \cdot N_{sc}^{RB}]\bmod 36, \qquad (5)$$
$$j = 1, \ldots, M$$

wherein, $d=s_i$, $k_{PRB,1}$ may express the initial position of the subcarrier of the $j^{th}$ PRB among the M PRBs.

Wherein, the position $N_1$ of the first PRB may be determined according to an equation (2) or an equation (3), may also be determined according to other manners, and this is not limited in the embodiment of the present invention.

Since the intervals between the M PRBs are equal, it may be set that interval $s_i=d$, namely, the interval between each two PRBs among the the M PRBs is d.

As stated, the interval between the $(i+1)^{th}$ PRB and the $i^{th}$ PRB among the M PRBs may be the position difference value between the $(i+1)^{th}$ PRB and the $i^{th}$ PRB, then the intervals between the M PRBs may be equal, in other words, the position difference value between each two PRBs may be equal. For example, it is assumed that M is 3, the interval between the first PRB and the second PRB is 1 and the interval between the second PRB and the third PRB is 1, in this case, the intervals among the three PRBs are equal.

Optionally, as another embodiment, in step 110, the intervals between the M PRBs may be equal. The base station may determine the initial position of the subcarrier of each PRB among the M PRBs according to an equation (6) and an equation (7).

$$k_{PRB,1} = \frac{N_{RB}^{DL} N_{sc}^{RB}}{2} - 36 + N_1 \cdot N_{sc}^{RB} \tag{6}$$

$$k_{PRB,j} = \frac{N_{RB}^{DL} N_{sc}^{RB}}{2} - 36 + \left(N_1 + \sum_{i=1}^{j-1} s_i\right) \cdot N_{sc}^{RB}, j = 2, \ldots, M \tag{7}$$

wherein, $k_{PRB,1}$ represents the initial position of the subcarrier of the first PRB among the M PRBs, and $k_{PRB,j}$ represents the initial position of the subcarrier of the $j^{th}$ PRB among the M PRBs.

Or, the intervals between the M PRBs are different. The base station may also determine the initial position of the subcarrier of each PRB among the M PRBs according to an equation (8) and an equation (9).

$$k_{PRB,1} = \frac{N_{RB}^{DL} N_{sc}^{RB}}{2} - 36 + N_1 \cdot N_{sc}^{RB}, \tag{8}$$

$$k_{PRB,j} = \frac{N_{RB}^{DL} N_{sc}^{RB}}{2} - 36 + \left[\left(N_1 + \sum_{i=1}^{j-1} s_i\right) \cdot N_{sc}^{RB}\right] \bmod 36 \tag{9}$$

$$j = 2, \ldots, M$$

wherein, $k_{PRB,1}$ represents the initial position of the subcarrier of the first PRB among the M PRBs, and $k_{PRB,j}$ represents the initial position of the subcarrier of the $j^{th}$ PRB among the M PRBs.

As stated, the interval between the $(i+1)^{th}$ PRB and the $i^{th}$ PRB among the M PRBs may be the position difference value between the $(i+1)^{th}$ PRB and the $i^{th}$ PRB, then the intervals between the M PRBs may be different, in other words, the position difference value between each two PRBs may be different. For example, it is assumed that M is 3, the interval between the first PRB and the second PRB is 1 and the interval between the second PRB and the third PRB is 2, in this case, the intervals among the three PRBs are different.

Optionally, as another embodiment, in step 110, the base station may acquire a frequency domain offset value between the position $N_1$ of the first PRB among the M PRBs in the current sub-frame and the position of the first PRB occupied by the broadcast channel of the first sub-frame. The position of the first PRB occupied by the broadcast channel of the first sub-frame may be determined according to the cell ID. The position $N_1$ of the first PRB among the M PRBs in the current sub-frame may be determined according to the frequency domain offset value and the position of the first PRB occupied by the broadcast channel of the first sub-frame.

It should be understood that, in step 110, the broadcast channel is the broadcast channel in the current sub-frame. For identical cells, in different sub-frames used for sending the broadcast channels, the positions of the broadcast channels may be different. For example, certain frequency domain offset may exist in the positions of the broadcast channels between different sub-frames.

The base station may acquire the frequency domain offset value between the broadcast channel in the current sub-frame and the broadcast channel of the first sub-frame, namely, the frequency domain offset value between the position $N_1$ of the first PRB among the M PRBs occupied by the broadcast channel in the current sub-frame and the position of the first PRB occupied by the broadcast channel of the first sub-frame, for example, the frequency domain offset value may be one PRB. In this way, by determining the position of the first PRB occupied by the broadcast channel of the first sub-frame, the position $N_1$ of the first PRB occupied by the broadcast channel in the current sub-frame may be determined. For example, the position of the first PRB occupied by the broadcast channel of the first sub-frame may be determined according to an equation (2) or an equation (3), may also be determined according to other manners, and this is not limited in the embodiment of the present invention.

In this way, since the broadcast channels between different sub-frames have offset on frequency domain, the interference between the broadcast channels of the cells may be effectively reduced.

Optionally, as another embodiment, the base station may acquire the frequency domain offset value from the position information, wherein the position information may further include the frequency domain offset value. Or, the base station may determine the frequency domain offset value according to the cell ID.

The frequency domain offset value may be pre-defined and is stored by the base station to serve as the position information of the broadcast channel. The frequency domain offset value may also be determined according to the cell ID. In addition, the frequency domain offset value may also be defined according to a particular pattern, for example, a costa sequence or a checkerboard pattern or the like.

Optionally, as another embodiment, the base station may acquire the positions of the M PRBs from the position information of the broadcast channel, wherein the position information may include the positions of the M PRBs.

The positions of the M PRBs may be pre-defined and are stored by the base station to serve as the position information of the broadcast channel. When determining the resource position of the broadcast channel, the base station may acquire the position information stored therein, in order to determine the positions of the M PRBs.

Optionally, as another embodiment, in step 120, the base station may adopt a mapping manner of demodulation reference signal (Demodulation Reference Signal, DMRS) rate matching (rate matching) to map the broadcast channel in the M PRBs according to a sequence of first frequency domain and then time domain or a sequence of first time domain and then frequency domain.

For example, when mapping the broadcast channel in the M PRBs, the base station may reserve the position of DMRS in advance and then map the broadcast channel in the PRBs according to a progressive index increase rule, in a sequence of first frequency domain and then time domain or a sequence of first time domain and then frequency domain. For example, the DMRS may occupy 12 REs or occupy 24 REs.

Optionally, as another embodiment, in step 120, the broadcast channel and a pilot carrier are mapped in each PRB among the M PRBs, wherein the pilot carrier does not include channel-state information reference signal (Channel-State Information Reference Signal, CSI-RS), common reference signal (Common Reference Signal, CRS) or position reference signal (Position Reference Signal, PRS).

Specifically, the base station may map the broadcast channel and the pilot carrier in the M PRBs, but the pilot carrier does not include CSI-RS, CRS or PRS, for example, the pilot carrier may be DMRS. When the base station performs the mapping operation in the M PRBs, the priority level of the broadcast channel is higher than that of some pilot carriers, for example, these pilot carriers with low priority levels may be CSI-RS, CRS or PRS. For example, if a resource element (Resource Element, RE) used for mapping the broadcast channel conflicts with the RE used for mapping the above-mentioned pilot carriers with low priority levels, the broadcast channel is mapped on the RE. The above-mentioned RE used for mapping the broadcast channel conflicting with the RE used for mapping the above-mentioned pilot carriers with low priority levels, may refer to that in on PRB, one or some REs may be used for both mapping the pilot carriers with low priority levels and the broadcast channel, so that conflict is generated. In this case, since the priority level of the broadcast channel is higher than that of these pilot carriers with low priority levels, the base station may map the broadcast channel on the RE with conflict without mapping the above-mentioned pilot carriers with low priority levels.

Optionally, as another embodiment, in any PRB among the M PRBs, the base station may divide the REs used for mapping the broadcast channel into n groups of REs, respectively map the n groups of REs on n antenna ports corresponding to n DMRSs, and send the broadcast message from the n antenna ports. Wherein, n is a positive integer.

Optionally, as another embodiment, in step 130, by adopting a random beam forming manner with order of 1, the base station may send the broadcast message from the n antenna ports.

The specific contents of the random beam forming manner may refer to the prior art, and will not be repeated redundantly herein to avoid repetition.

Optionally, as another embodiment, the above-mentioned carrier may be an NCT carrier.

For the independently existing NCT carrier, namely, not depending on the traditional carrier, a broadcast message could not be sent depending on the traditional carrier, and a broadcast channel needs to be arranged on the NCT carrier to transmit the broadcast message. The NCT carrier is different from the traditional carrier, so that the broadcast channel may not be arranged according to the arrangement manner of the PBCH on the traditional carrier. Therefore, in the embodiment of the present invention, by determining the resource position of the broadcast channel, wherein the broadcast channel occupies M PRBs among m PRBs of the frequency band center of the carrier, the base station may map the broadcast channel on the resource position, so as to transmit the broadcast message on the NCT carrier.

Figure 2:
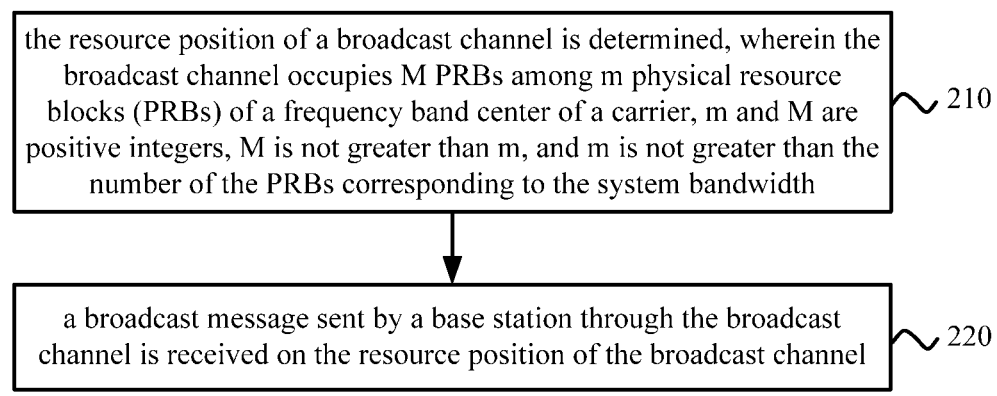
FIG. 2 is a schematic diagram of a flow of a broadcast message transmission method according to an embodiment of the present invention.

FIG. 2 is a schematic diagram of a flow of a broadcast message transmission method according to an embodiment of the present invention. The method of FIG. 2 is implemented by UE.

210, the resource position of a broadcast channel is determined, wherein the broadcast channel occupies M PRBs among m physical resource blocks (PRBs) of a frequency band center of a carrier, m and M are positive integers, M is not greater than m, and m is not greater than the number of the PRBs corresponding to the system bandwidth.

It should be understood that, in the embodiment of the present invention, the broadcast channel may be a channel used for transmitting a broadcast message, for example, may be PBCH, may also be ePBCH and may also be other channels. This is not limited in the embodiments of the present invention.

220, a broadcast message sent by a base station through the broadcast channel is received on the resource position of the broadcast channel.

In the embodiment of the present invention, since the broadcast channel occupies M PRBs among m PRBs of a frequency band center of the carrier, by receiving a broadcast message through the broadcast channel, the resource utilization rate of the carrier may be improved.

Optionally, as an embodiment, in step 210, the UE may determine the positions of the M PRBs according to the position information of the broadcast channel, wherein the position information includes a cell ID.

The UE may pre-store the position information therein, to acquire the position information when determining the positions of the M PRBs. The position information may include a cell ID pre-allocated by the base station. When accessing to the cell, the UE may acquire the cell ID from the base station and store the same therein.

It should also be understood that, in the embodiment of the present invention, the cell ID may be a physical layer cell ID, an enhanced cell ID, a logic cell ID or a virtual cell ID or the like, and this is not limited in the embodiment of the present invention.

In the embodiment of the present invention, the positions of the M PRBs are determined according to the position information including the cell ID, and since the cell IDs of the cells are different, interference between the broadcast channels of the cells may be effectively overcome.

Optionally, as another embodiment, in step 210, the position information may further include an interval $s_i$ between the $(i+1)^{th}$ PRB and the $i^{th}$ PRB among the M PRBs, wherein i is a positive integer, and i is not smaller than 1 and is not greater than M−1. The UE may determine the position $N_1$ of the first PRB occupied by the broadcast channel according to the cell ID, and determine the position $N_{i+1}$ of the $(i+1)^{th}$ PRB according to an equation (1), in accordance with the position $N_1$ of the first PRB and the interval $s_i$.

The UE may determine the position $N_1$ of the first PRB occupied by the broadcast channel according to the cell ID. For example, the position $N_1$ of the first PRB may be determined according to an equation (2) or (3), the position $N_1$ of the first PRB may also be determined according to other manners, and this is not limited in the embodiment of the present invention.

After determining the position $N_1$ of the first PRB occupied by the broadcast channel, the UE may determine the position of each PRB among the M PRBs according to position $N_1$ of the first PRB and the interval between each two PRBs among the M PRBs. The interval $s_i$ between the $(i+1)^{th}$ PRB and the $i^{th}$ PRB among the M PRBs may be a position difference value between the $(i+i)^{th}$ PRB and the $i^{th}$ PRB, for example, it is assumed that the second PRB and the first PRB are adjacent, then the interval therebetween is 1. It is assumed that three PRBs exist between the second PRB and the first PRB, and then the interval between the second PRB and the first PRB is 4. The interval between the $(i+1)^{th}$ PRB and the $i^{th}$ PRB may be predefined. In this way, the UE may determine the position of $(i+1)^{th}$ PRB according to the equation (1). For example, the position of the second PRB is: $N_2=N_1+s_1$, and $s_1$ is the interval between the second PRB and the first PRB, and the like.

Optionally, as another embodiment, in step 210, the position information may further include an interval $s_i$ between the $(i+1)^{th}$ PRB and the $i^{th}$ PRB among the M PRBs, a system bandwidth $N_{RB}^{DL}$ and the number $N_{sc}^{RB}$ of subcarriers contained in one PRB. The UE may determine the position $N_1$ of the first PRB occupied by the broadcast channel according to the cell ID, and determine the initial position of the subcarrier of each PRB among the M PRBs according to the position $N_1$ of the first PRB, the interval $s_i$, the system bandwidth $N_{RB}^{DL}$ and the number $N_{sc}^{RB}$ of subcarriers contained in one PRB.

The UE may determine the initial position of the subcarrier of each PRB among the M PRBs, namely, determining the position of each PRB.

Optionally, as another embodiment, in step 210, the intervals between the M PRBs may be equal. The UE may determine the initial position of the subcarrier of each PRB among the M PRBs according to an equation (4) or an equation (5).

Wherein, the position $N_1$ of the first PRB may be determined according to an equation (2) or an equation (3), may also be determined according to other manners, and this is not limited in the embodiment of the present invention.

Optionally, as another embodiment, in step 210, the intervals between the M PRBs may be equal. The UE may determine the initial position of the subcarrier of each PRB among the M PRBs according to an equation (6) and an equation (7). Or, UE may determine the initial position of the subcarrier of each PRB among the M PRBs according to an equation (8) and an equation (9).

Optionally, as another embodiment, in step 210, the UE may acquire a frequency domain offset value between the position $N_1$ of the first PRB among the M PRBs in the current sub-frame and the position of the first PRB occupied by the broadcast channel of the first sub-frame. The position of the first PRB occupied by the broadcast channel of the first sub-frame may be determined according to the cell ID. The position $N_1$ of the first PRB among the M PRBs in the current sub-frame may be determined according to the frequency domain offset value and the position of the first PRB occupied by the broadcast channel of the first sub-frame.

It should be understood that, in step 210, the broadcast channel is the broadcast channel in the current sub-frame. For identical cells, between different sub-frames, the positions of the broadcast channels may be different. For example, certain frequency domain offset may exist in the positions of the broadcast channels between different sub-frames.

The UE may acquire the frequency domain offset value between the broadcast channel in the current sub-frame and the broadcast channel of the first sub-frame, namely, the frequency domain offset value between the position $N_1$ of the first PRB among the M PRBs occupied by the broadcast channel in the current sub-frame and the position of the first PRB occupied by the broadcast channel of the first sub-frame, for example, the frequency domain offset value may be one PRB. In this way, by determining the position of the first PRB occupied by the broadcast channel of the first sub-frame, the position $N_1$ of the first PRB occupied by the broadcast channel in the current sub-frame may be determined. For example, the position of the first PRB occupied by the broadcast channel of the first sub-frame may be determined according to an equation (2) or an equation (3), may also be determined according to other manners, and this is not limited in the embodiment of the present invention.

In this way, since the broadcast channels between different sub-frames have offset on frequency domain, the interference between the broadcast channels of the cells may be effectively reduced.

Optionally, as another embodiment, in step 210, the UE may acquire the frequency domain offset value from the position information, wherein the position information may further include the frequency domain offset value. Or, the UE may determine the frequency domain offset value according to the cell ID.

The frequency domain offset value may be pre-defined and is stored by the UE to serve as the position information of the broadcast channel. The frequency domain offset value may also be determined according to the cell ID. In addition, the frequency domain offset value may also be defined according to a particular pattern, for example, a costa sequence or a checkerboard pattern or the like.

Optionally, as another embodiment, in step 210, the UE may acquire the positions of the M PRBs from the position information of the broadcast channel, wherein the position information includes the positions of the M PRBs.

Specifically, the positions of the M PRBs may be pre-defined and are stored by the UE to serve as the position information of the broadcast channel. When determining the resource position of the broadcast channel, the UE may acquire the position information stored therein, in order to determine the positions of the M PRBs.

Optionally, as another embodiment, the UE may receive the broadcast message sent by the base station through the broadcast channel on the M PRBs, wherein each PRB among the M PRBs is used by the base station for mapping the broadcast channel and a pilot carrier, and the above-mentioned pilot carrier does not include CSI-RS, CRS or PRS.

Specifically, the base station may map the broadcast channel and pilot carriers in the M PRBs, and these pilot carriers do not include CSI-RS, CRS or PRS. While the UE may default that these pilot carriers are not included in the M PRBs, so as to receive the broadcast message sent by the base station on the M PRBs.

Optionally, as another embodiment, the above-mentioned carrier may be an NCT carrier.

For the independently existing NCT carrier, namely, not depending on the traditional carrier, a broadcast message could not be sent depending on the traditional carrier, and a broadcast channel needs to be arranged on the NCT carrier to transmit the broadcast message. The NCT carrier is different from the traditional carrier, so that the broadcast channel may not be arranged according to the arrangement manner of the PBCH on the traditional carrier. Therefore, in the embodiment of the present invention, by determining the resource position of the broadcast channel, wherein the broadcast channel occupies M PRBs among m PRBs of the frequency band center of the carrier, the UE may receive the broadcast message sent by the base station through the broadcast channel on the resource position, so as to transmit the broadcast message on the NCT carrier.

The embodiment of the present invention will be described below in detail in combination with specific examples. It should be noted that, these examples are only intended to help those skilled in the art to better understand the embodiment of the present invention, rather than limiting the scope of the embodiment of the present invention.

Figure 3:
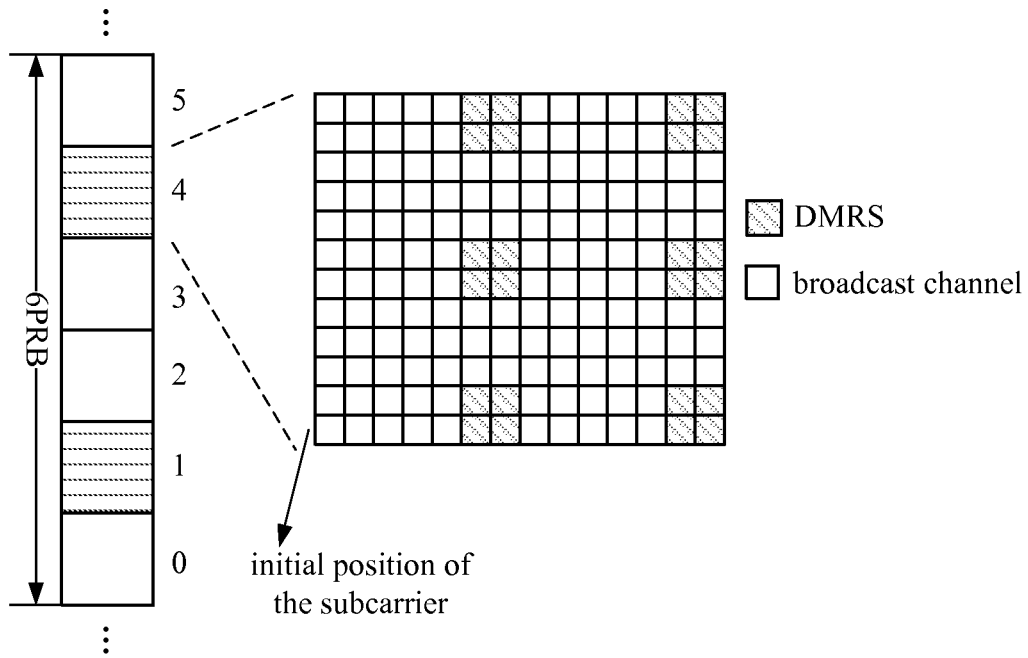
FIG. 3 is a schematic diagram of an example of resource mapping of a broadcast channel according to an embodiment of the present invention.

FIG. 3 is a schematic diagram of an example of resource mapping of a broadcast channel according to an embodiment of the present invention.

As shown in FIG. 3, it is assumed that #0 to #5 PRBs are 6 PRBs of the frequency band center of the NCT carrier. Wherein, the broadcast channel may occupy 2 PRBs, for example, #1 PRB and #4 PRB.

The base station or UE may respectively determine the positions of the two PRBs occupied by the broadcast channel, and may also respectively determine the initial positions of the respective subcarriers of the two PRBs occupied by the broadcast channel.

The base station or UE may determine the position, namely, the position of the #1 PRB, of the first PRB occupied by the broadcast channel according to the cell ID in the position information, for example, may determine the position of the #1 PRB according to an equation (2) or an equation (3).

As shown in FIG. 3, the interval between the two PRBs occupied by the broadcast channel is 3. Then, the base station or UE may determine the position of the second PRB, namely, the position of the #4 PRB, occupied by the broadcast channel according to the position of the #1 PRB and the interval between the two PRBs.

In addition, the base station or UE may respectively determine the initial positions of the subcarriers of the two PRBs occupied by the broadcast channel. For example, the initial position of the subcarrier of the #1 PRB and the initial position of the subcarrier of the #4 PRB may be respectively determined according to an equation (4) or an equation (5).

In the embodiment of the present invention, since the broadcast channel occupies M PRBs among m PRBs of the frequency band center of the carrier, by sending or receiving the broadcast message through the broadcast channel, the resource utilization rate of the carrier may be improved.

Figure 4:
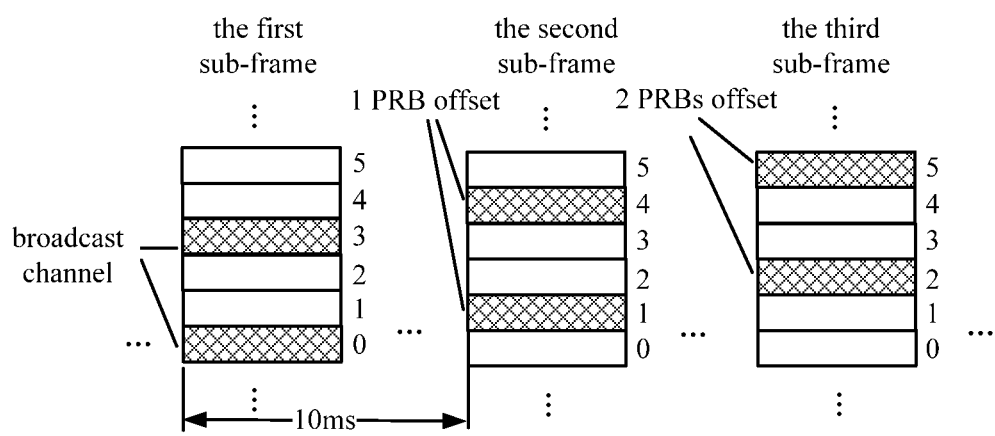
FIG. 4 is a schematic diagram of an example of offsetting a broadcast channel between different sub-frames according to an embodiment of the present invention.

FIG. 4 is a schematic diagram of an example of offsetting a broadcast channel between different sub-frames according to an embodiment of the present invention.

For identical cells, in different sub-frames used for sending the broadcast channels, the positions of the broadcast channels may be different. For example, certain frequency domain offset may be present in the positions of the broadcast channels between different sub-frames.

For example, as shown in FIG. 4, it is assumed that m is equal to 6 and M is equal to 2, namely, the broadcast channel occupies 2 PRBs among 6 PRBs of the frequency band center. The length of each radio frame is 10 ms. It is assumed that one sub-frame in each radio frame is used for sending the broadcast channel, as shown in FIG. 4, 3 sub-frames are used for sending the broadcast channel, and are respectively the first sub-frame, the second sub-frame and the third sub-frame. It is assumed that the broadcast channel occupies the #0 PRB and the #3 PRB in the first sub-frame and the frequency domain offset value is one PRB, then the broadcast channel may occupy the #1 PRB and the #4 PRB in the second sub-frame, and the broadcast channel may occupy the #2 PRB and the #5 PRB in the third sub-frame.

It should be noted that, although FIG. 4 shows three sub-frames, in the embodiment of the present invention, it is not limited that three sub-frames are used for sending the broadcast channel, and a larger number of sub-frames may be used for sending the broadcast channel.

In this way, since the broadcast channels between different sub-frames have offset on frequency domain, the interference between the broadcast channels of the cells may be effectively reduced.

Figure 5:
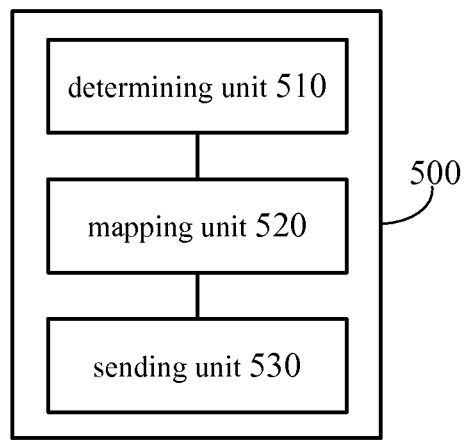
FIG. 5 is a schematic block diagram of a base station according to an embodiment of the present invention.

FIG. 5 is a schematic block diagram of a base station according to an embodiment of the present invention. The base station 500 of FIG. 5 includes a determining unit 510, a mapping unit 520 and a sending unit 530.

The determining unit 510 is configured to determine the resource position of a broadcast channel, wherein the broadcast channel occupies M PRBs among m physical resource blocks (PRBs) of a frequency band center of a carrier, m and M are positive integers, M is not greater than m, and m is not greater than the number of the PRBs corresponding to the system bandwidth. The mapping unit 520 is configured to map the broadcast channel on the resource position. The sending unit 530 is configured to send a broadcast message through the broadcast channel.

In the embodiments of the present invention, since the broadcast channel occupies M PRBs among m PRBs of a frequency band center of a carrier, by mapping the broadcast channel on the resource position and sending a broadcast message through the broadcast channel, the resource utilization rate of the carrier may be improved.

Other functions and operations of the base station 500 may refer to processes involving the base station in the method embodiments of FIG. 1 to FIG. 4, and will not be repeated redundantly herein, in order to avoid repetition.

Optionally, as an embodiment, the determining unit 510 may determine the positions of the M PRBs according to the position information of the broadcast channel, wherein the position information includes a cell identifier.

Optionally, as another embodiment, the position information may further include an interval $s_i$ between the $(i+1)^{th}$ PRB and the $i^{th}$ PRB among the M PRBs, wherein i is a positive integer, and i is not smaller than 1 and is not greater than M−1. The determining unit 510 may determine the position $N_1$ of the first PRB among the M PRBs according to the cell identifier, and determine the position $N_{i+1}$ of the $(i+1)^{th}$ PRB according to an equation (1), in accordance with the position $N_1$ of the first PRB and the interval $s_i$.

Optionally, as another embodiment, the position information may further include an interval $s_i$ between the $(i+1)^{th}$ PRB and the $i^{th}$ PRB among the M PRBs, a system bandwidth $N_{RB}^{DL}$ and the number $N_{sc}^{RB}$ of subcarriers contained in one PRB, wherein i is a positive integer, and i is not smaller than 1 and is not greater than M−1. The determining unit 510 may determine the position $N_1$ of the first PRB among the M PRBs according to the cell identifier, and determine the initial position of the subcarrier of each PRB among the M PRBs according to the position $N_1$ of the first PRB, the interval $s_i$, the system bandwidth $N_{RB}^{DL}$ and the number $N_{sc}^{LD}$ of subcarriers contained in one PRB.

Optionally, as another embodiment, the intervals between the M PRBs may be equal. The determining unit 510 may determine the initial position of the subcarrier of each PRB among the M PRBs according to an equation (4) or an equation (5).

Optionally, as another embodiment, the intervals between the M PRBs may be different. The determining unit 510 may determine the initial position of the subcarrier of each PRB among the M PRBs according to an equation (6) and an equation (7). Or, UE may determine the initial position of the subcarrier of each PRB among the M PRBs according to an equation (8) and an equation (9).

Optionally, as another embodiment, the determining unit 510 may acquire a frequency domain offset value between the position $N_1$ of the first PRB among the M PRBs in the current sub-frame and the position of the first PRB occupied by the broadcast channel of the first sub-frame; determine the position of the first PRB occupied by the broadcast channel of the first sub-frame according to the cell identifier; and determine the position $N_1$ of the first PRB among the M PRBs in the current sub-frame according to the frequency domain offset value and the position of the first PRB occupied by the broadcast channel of the first sub-frame.

Optionally, as another embodiment, the determining unit 510 may acquire the frequency domain offset value from the position information, wherein the position information further includes the frequency domain offset value; or may determine the frequency domain offset value according to the cell identifier.

Optionally, as another embodiment, the determining unit 510 may acquire the positions of the M PRBs from the position information of the broadcast channel, wherein the position information includes the positions of the M PRBs.

Optionally, as another embodiment, the mapping unit 520 may adopt a mapping manner matched with a DMRS rate to map the broadcast channel in the M PRBs according to a sequence of first frequency domain and then time domain or a sequence of first time domain and then frequency domain.

Optionally, as another embodiment, in each PRB among the M PRBs, the mapping unit 520 may map the broadcast channel and a pilot carrier, wherein the above-mentioned pilot carrier does not include CSI-RS, CRS or PRS.

Optionally, as another embodiment, the mapping unit 520 may also divide REs mapping the broadcast channel into n groups of REs in any PRB among the M PRBs, wherein n is a positive integer; and respectively map the n groups of REs on n antenna ports corresponding to n DMRSs. The sending unit 530 may send the broadcast message from the n antenna ports.

Optionally, as another embodiment, the sending unit 530 may send the broadcast message from the n antenna ports in a random beam forming manner with order of 1.

Optionally, as another embodiment, the above-mentioned carrier may be an NCT carrier.

In the embodiments of the present invention, since the broadcast channel occupies M PRBs among m PRBs of a frequency band center of a carrier, by mapping the broadcast channel on the resource position and sending a broadcast message through the broadcast channel, the resource utilization rate of the carrier may be improved.

Figure 6:
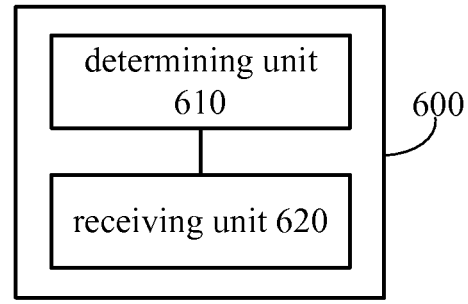
FIG. 6 is a schematic block diagram of UE according to an embodiment of the present invention.

FIG. 6 is a schematic block diagram of UE according to an embodiment of the present invention. UE 600 includes a determining unit 610 and a receiving unit 620.

The determining unit 610 is configured to determine the resource position of a broadcast channel, wherein the broadcast channel occupies M PRBs among m physical resource blocks (PRBs) of a frequency band center of a carrier, m and M are positive integers, M is not greater than m, and m is not greater than the number of the PRBs corresponding to the system bandwidth. The receiving unit 620 is configured to receive a broadcast message sent by a base station through the broadcast channel.

In the embodiment of the present invention, since the broadcast channel occupies M PRBs among m PRBs of a frequency band center of the carrier, by receiving a broadcast message through the broadcast channel, the resource utilization rate of the carrier may be improved.

Optionally, as an embodiment, the determining unit 610 may determine the positions of the M PRBs according to the position information of the broadcast channel, wherein the position information includes a cell identifier.

Optionally, as another embodiment, the position information may further include an interval $s_i$ between the $(i+1)^{th}$ PRB and the $i^{th}$ PRB among the M PRBs, wherein i is a positive integer, and i is not smaller than 1 and is not greater than M−1. The determining unit 610 may determine the position $N_1$ of the first PRB among the M PRBs according to the cell identifier, and determine the position $N_{i+1}$ of the $(i+1)^{th}$ PRB according to an equation (1), in accordance with the position $N_1$ of the first PRB and the interval $s_i$.

Optionally, as another embodiment, the position information may further include an interval $s_i$ between the $(i+1)^{th}$ PRB and the $i^{th}$ PRB among the M PRBs, a system bandwidth and the number of subcarriers contained in one PRB. The determining unit 610 may determine the position $N_1$ of the first PRB among the M PRBs according to the cell identifier, and determine the initial position of the subcarrier of each PRB among the M PRBs according to the position $N_1$ of the first PRB, the interval $s_i$, the system bandwidth $N_{RB}^{DL}$ and the number $N_{sc}^{RB}$ of subcarriers contained in one PRB.

Optionally, as another embodiment, the intervals between the M PRBs may be equal. The determining unit 610 may determine the initial position of the subcarrier of each PRB among the M PRBs according to an equation (4) or an equation (5).

Optionally, as another embodiment, the intervals between the M PRBs may be different. The determining unit 610 may determine the initial position of the subcarrier of each PRB among the M PRBs according to an equation (6) and an equation (7). Or, UE may determine the initial position of the subcarrier of each PRB among the M PRBs according to an equation (8) and an equation (9).

Optionally, as another embodiment, the determining unit 610 may acquire a frequency domain offset value between the position $N_1$ of the first PRB among the M PRBs in the current sub-frame and the position of the first PRB occupied by the broadcast channel of the first sub-frame; determine the position of the first PRB occupied by the broadcast channel of the first sub-frame according to the cell identifier; and determine the position $N_1$ of the first PRB among the M PRBs in the current sub-frame according to the frequency domain offset value and the position of the first PRB occupied by the broadcast channel of the first sub-frame.

Optionally, as another embodiment, the determining unit 610 may acquire the frequency domain offset value from the position information, wherein the position information further includes the frequency domain offset value; or, may determine the frequency domain offset value according to the cell identifier.

Optionally, as another embodiment, the determining unit 610 may acquire the positions of the M PRBs from the position information of the broadcast channel, wherein the position information includes the positions of the M PRBs.

Optionally, as another embodiment, the receiving unit 620 may receive the broadcast message sent by the base station through the broadcast channel on the M PRBs, wherein each PRB among the M PRBs is used by the base station for mapping the broadcast channel and a pilot carrier, and the above-mentioned pilot carrier does not include CSI-RS, CRS or PRS.

Optionally, as another embodiment, the above-mentioned carrier may be an NCT carrier.

In the embodiment of the present invention, since the broadcast channel occupies M PRBs among m PRBs of a frequency band center of the carrier, by receiving a broadcast message through the broadcast channel, the resource utilization rate of the carrier may be improved.

Figure 7:
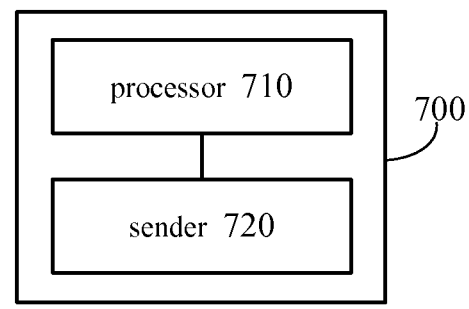
FIG. 7 is a schematic block diagram of a base station according to an embodiment of the present invention.

FIG. 7 is a schematic block diagram of a base station according to an embodiment of the present invention. The base station 700 of FIG. 7 includes a processor 710 and a sender 720.

The processor 710 is configured to determine the resource position of a broadcast channel, wherein the broadcast channel occupies M PRBs among m physical resource blocks (PRBs) of a frequency band center of a carrier, m and M are positive integers, M is not greater than m, and m is not greater than the number of the PRBs corresponding to the system bandwidth. The processor 710 is further configured to map the broadcast channel on the resource position. The sender 720 is configured to send a broadcast message through the broadcast channel.

In the embodiments of the present invention, since the broadcast channel occupies M PRBs among m PRBs of a frequency band center of a carrier, by mapping the broadcast channel on the resource position and sending a broadcast message through the broadcast channel, the resource utilization rate of the carrier may be improved.

Other functions and operations of the base station 700 may refer to processes involving the base station in the method embodiments of FIG. 1 to FIG. 4, and will not be repeated redundantly herein, in order to avoid repetition.

Optionally, as another embodiment, the processor 710 may determine the positions of the M PRBs according to the position information of the broadcast channel, wherein the position information includes a cell identifier.

Optionally, as another embodiment, the position information may further include an interval $s_i$ between the $(i+1)^{th}$ PRB and the $i^{th}$ PRB among the M PRBs, wherein i is a positive integer, and i is not smaller than 1 and is not greater than M−1. The processor 710 may determine the position $N_1$ of the first PRB among the M PRBs according to the cell identifier, and determine the position $N_{i+1}$ of the $(i+1)^{th}$ PRB according to an equation (1), in accordance with the position $N_1$ of the first PRB and the interval $s_i$.

Optionally, as another embodiment, the position information may further include an interval $s_i$ between the $(i+1)^{th}$ PRB and the $i^{th}$ PRB among the M PRBs, a system bandwidth $N_{RB}^{DL}$ and the number $N_{sc}^{RB}$ of subcarriers contained in one PRB, wherein i is a positive integer, and i is not smaller than 1 and is not greater than M−1. The processor 710 may determine the position $N_1$ of the first PRB among the M PRBs according to the cell identifier, and determine the initial position of the subcarrier of each PRB among the M PRBs according to the position $N_1$ of the first PRB, the interval $s_i$, the system bandwidth N and the number N of subcarriers contained in one PRB.

Optionally, as another embodiment, the intervals between the M PRBs may be equal. The processor 710 may determine the initial position of the subcarrier of each PRB among the M PRBs according to an equation (4) or an equation (5).

Optionally, as another embodiment, the intervals between the M PRBs may be different. The processor 710 may determine the initial position of the subcarrier of each PRB among the M PRBs according to an equation (6) and an equation (7). Or, UE may determine the initial position of the subcarrier of each PRB among the M PRBs according to an equation (8) and an equation (9).

Optionally, as another embodiment, the processor 710 may acquire a frequency domain offset value between the position $N_i$ of the first PRB among the M PRBs in the current sub-frame and the position of the first PRB occupied by the broadcast channel of the first sub-frame; determine the position of the first PRB occupied by the broadcast channel of the first sub-frame according to the cell identifier; and determine the position $N_1$ of the first PRB among the M PRBs in the current sub-frame according to the frequency domain offset value and the position of the first PRB occupied by the broadcast channel of the first sub-frame.

Optionally, as another embodiment, the processor 710 may acquire the frequency domain offset value from the position information, wherein the position information further includes the frequency domain offset value; or may determine the frequency domain offset value according to the cell identifier.

Optionally, as another embodiment, the processor 710 may acquire the positions of the M PRBs from the position information of the broadcast channel, wherein the position information includes the positions of the M PRBs.

Optionally, as another embodiment, the processor 710 may adopt a mapping manner matched with a DMRS rate to map the broadcast channel in the M PRBs according to a sequence of first frequency domain and then time domain or a sequence of first time domain and then frequency domain.

Optionally, as another embodiment, in each PRB among the M PRBs, the processor 710 may map the broadcast channel and a pilot carrier, wherein the above-mentioned pilot carrier does not include CSI-RS, CRS or PRS.

Optionally, as another embodiment, the processor 710 may also divide REs mapping the broadcast channel into n groups of REs in any PRB among the M PRBs, wherein n is a positive integer; respectively map the n groups of REs on n antenna ports corresponding to n DMRSs; and may send the broadcast message from the n antenna ports.

Optionally, as another embodiment, the sender 720 may send the broadcast message from the n antenna ports in a random beam forming manner with order of 1.

Optionally, as another embodiment, the above-mentioned carrier may be an NCT carrier.

In the embodiments of the present invention, since the broadcast channel occupies M PRBs among m PRBs of a frequency band center of a carrier, by mapping the broadcast channel on the resource position and sending a broadcast message through the broadcast channel, the resource utilization rate of the carrier may be improved.

Figure 8:
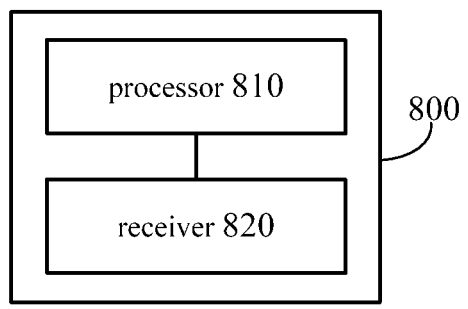
FIG. 8 is a schematic block diagram of UE according to an embodiment of the present invention.

FIG. 8 is a schematic block diagram of UE according to an embodiment of the present invention. UE 800 includes a processor 810 and a receiver 820.

The processor 810 is configured to determine the resource position of a broadcast channel, wherein the broadcast channel occupies M PRBs among m physical resource blocks (PRBs) of a frequency band center of a carrier, m and M are positive integers, M is not greater than m, and m is not greater than the number of the PRBs corresponding to the system bandwidth. The receiver 820 is configured to receive a broadcast message sent by a base station through the broadcast channel.

In the embodiment of the present invention, since the broadcast channel occupies M PRBs among m PRBs of a frequency band center of the carrier, by receiving a broadcast message through the broadcast channel, the resource utilization rate of the carrier may be improved.

Optionally, as another embodiment, the processor 810 may determine the positions of the M PRBs according to the position information of the broadcast channel, wherein the position information includes a cell identifier.

Optionally, as another embodiment, the position information may further include an interval $s_i$ between the $(i+1)^{th}$ PRB and the $i^{th}$ PRB among the M PRBs, wherein i is a positive integer, and i is not smaller than 1 and is not greater than M−1. The processor 810 may determine the position $N_1$ of the first PRB among the M PRBs according to the cell identifier, and determine the position $N_{i+1}$ of the $(i+1)^{th}$ PRB according to an equation (1), in accordance with the position $N_1$ of the first PRB and the interval $s_i$.

Optionally, as another embodiment, the position information may further include an interval si between the $(i+1)^{th}$ PRB and the $i^{th}$ PRB among the M PRBs, a system bandwidth $N_{RB}^{DL}$ and the number $N_{sc}^{RB}$ of subcarriers contained in one PRB. The processor 810 may determine the position $N_1$ of the first PRB among the M PRBs according to the cell identifier, and determine the initial position of the subcarrier of each PRB among the M PRBs according to the position $N_1$ of the first PRB, the interval $s_i$, the system bandwidth N and the number N of subcarriers contained in one PRB.

Optionally, as another embodiment, the intervals between the M PRBs may be equal. The processor 810 may determine the initial position of the subcarrier of each PRB among the M PRBs according to an equation (4) or an equation (5).

Optionally, as another embodiment, the intervals between the M PRBs may be different. The processor 810 may determine the initial position of the subcarrier of each PRB among the M PRBs according to an equation (6) and an equation (7). Or, UE may determine the initial position of the subcarrier of each PRB among the M PRBs according to an equation (8) and an equation (9).

Optionally, as another embodiment, the processor 810 may acquire a frequency domain offset value between the position $N_1$ of the first PRB among the M PRBs in the current sub-frame and the position of the first PRB occupied by the broadcast channel of the first sub-frame; determine the position of the first PRB occupied by the broadcast channel of the first sub-frame according to the cell identifier; and determine the position $N_1$ of the first PRB among the M PRBs in the current sub-frame according to the frequency domain offset value and the position of the first PRB occupied by the broadcast channel of the first sub-frame.

Optionally, as another embodiment, the processor 810 may acquire the frequency domain offset value from the position information, wherein the position information further includes the frequency domain offset value; or, may determine the frequency domain offset value according to the cell identifier.

Optionally, as another embodiment, the processor 810 may acquire the positions of the M PRBs from the position information of the broadcast channel, wherein the position information includes the positions of the M PRBs.

Optionally, as another embodiment, the receiver 820 may receive the broadcast message sent by the base station through the broadcast channel on the M PRBs, wherein each PRB among the M PRBs is used by the base station for mapping the broadcast channel and a pilot carrier, and the above-mentioned pilot carrier does not include CSI-RS, CRS or PRS.

Optionally, as another embodiment, the above-mentioned carrier may be an NCT carrier.

In the embodiment of the present invention, since the broadcast channel occupies M PRBs among m PRBs of a frequency band center of the carrier, by receiving a broadcast message through the broadcast channel, the resource utilization rate of the carrier may be improved.

Those of ordinary skills in the art may be aware that, units and algorithm steps of the examples described in the embodiments disclosed in this paper may be implemented by electronic hardware or a combination of computer software and the electronic hardware. Whether these functions are implemented in the form of hardware or software is determined by specific applications and design constraint conditions of the technical solutions. Those skilled may implement the described functions by using different methods for each specific application, but this implementation should not be considered beyond the scope of the present invention.

Those skilled in the art to which the present invention pertains may clearly understand that, for convenience and concision of description, the specific working processes of the system, apparatus and units described above may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the units is only a logic function division, other division manners may exist in practical implementation, for example, multiple units or components may be combined or integrated to another system, or some features may be omitted or not implemented. From another point of view, the displayed or discussed mutual coupling or direct coupling or communication connection may be indirect coupling or communication connection of devices or units through some interfaces, and may be in electrical, mechanical or other forms.

The units described as separate components may be separated physically or not, components displayed as units may be physical units or not, namely, may be located in one place, or may be distributed on multiple network units. A part of or all of the units may be selected to achieve the purposes of the technical solutions in the embodiments according to actual demand.

In addition, the functional units in the embodiments of the present invention may be integrated in a processing unit, or the units singly exist physically, or two or more units are integrated in one unit.

If the function is implemented in the form of a software functional unit and is sold or used as an independent product, it may be stored in a computer readable storage medium. Based on this understanding, the technical solutions of the present invention substantially, or the part contributing to the prior art, or a part of the technical solutions may be implemented in the form of a software product, the computer software product is stored in a storage medium, and includes multiple instructions enabling a computer device (may be a personnel computer, a server, or network device, etc.) to execute all or a part of the steps of the methods in the embodiments of the present invention. The foregoing storage medium includes a variety of media capable of storing program codes, such as a USB disk, a mobile hard disk, a read-only memory (ROM, Read-Only Memory), a random access memory (RAM, Random Access Memory), a magnetic disk, an optical disk or the like.

The foregoing descriptions are merely specific embodiments of the present invention, rather than limiting the protection scope of the present invention. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:

1. A broadcast message transmission method, comprising:

determining, by a user equipment, the resource position of a broadcast channel, wherein the broadcast channel occupies M physical resource blocks (PRBs) among m PRBs of a frequency band center of a carrier, m and M are positive integers, M is not greater than m, and m is less than the number of the PRBs corresponding to the system bandwidth; and receiving, by the user equipment, a broadcast message sent by a base station through the broadcast channel on the resource position of the broadcast channel, wherein the determining, by a user equipment, the resource position of a broadcast channel comprises:

determining, by the user equipment, the positions of the M PRBs according to the position information of the broadcast channel, wherein the position information comprises a cell identifier, the position information further comprises an interval $s_i$ between the $(i+1)^{th}$ PRB and the $i^{th}$ PRB among the M PRBs, wherein i is a positive integer, and i is not smaller than 1 and is not greater than M−1;

the determining, by the user equipment, the positions of the M PRBs according to the position information of the broadcast channel, comprises:

determining, by the user equipment, the position $N_1$ of the first PRB among the M PRBs according to the cell identifier; and determining, by the user equipment, the position $N_{i+1}$ of the $(i+1)^{th}$ PRB according to an equation $N_{i+1}=N_i+s_i$, in accordance with the position $N_1$ of the first PRB and the interval $s_i$, wherein $N_i$ is the position of the $i^{th}$ PRB.

2. The method of claim 1, wherein the determining, by user equipment, the position $N_1$ of the first PRB among the M PRBs according to the cell identifier, comprises:

acquiring, by the user equipment, a frequency domain offset value between the position $N_1$ of the first PRB among the M PRBs in the current sub-frame and the position of the first PRB occupied by the broadcast channel of the first sub-frame;

determining, by the user equipment, the position of the first PRB occupied by the broadcast channel of the first sub-frame according to the cell identifier; and determining, by the user equipment, the position $N_1$ of the first PRB among the M PRBs in the current sub-frame according to the frequency domain offset value and the position of the first PRB occupied by the broadcast channel of the first sub-frame.

3. The method of claim 2, wherein the acquiring, by the user equipment, a frequency domain offset value between the position $N_1$ of the first PRB among the M PRBs in the current sub-frame and the position of the first PRB occupied by the broadcast channel of the first sub-frame, comprises:

acquiring, by the user equipment, the frequency domain offset value from the position information, wherein the position information further comprises the frequency domain offset value; or, determining, by the user equipment, the frequency domain offset value according to the cell identifier.

4. The method of claim 1, wherein the receiving, by the user equipment, a broadcast message sent by a base station through the broadcast channel on the resource position of the broadcast channel, comprises:

receiving, by the user equipment, the broadcast message sent by the base station through the broadcast channel on the M PRBs, wherein each PRB among the M PRBs is used by the base station for mapping the broadcast channel and a pilot carrier, wherein the pilot carrier does not comprise channel-state information reference signal (CSI-RS), common reference signal (CRS) or position reference signal (PRS).

5. A base station, comprising: a processor and a sender coupled to the processor; wherein the processor is configured to determine a resource position of a broadcast channel, wherein the broadcast channel occupies M physical resource blocks (PRBs) among m PRBs of a frequency band center of a carrier, m and M are positive integers, M is less than m, and m is not greater than the number of the PRBs corresponding to the system bandwidth; and to map the broadcast channel on the resource position; and the sender is configured to send a broadcast message through the broadcast channel, wherein the processor determining the resource position of the broadcast channel is configured to determine the positions of the M PRBs according to the position information of the broadcast channel, wherein the position information comprises a cell identifier, the position information further comprises an interval $s_i$ between the $(i+1)^{th}$ PRB and the $i^{th}$ PRB among the M PRBs, wherein i is a positive integer, and i is not smaller than 1 and is not greater than M−1;

wherein the processor determining the positions of the M PRBs according to the position information is configured to determine the position $N_1$ of the first PRB among the M PRBs according to the cell identifier, and determine the position $N_{i+1}$ of the $(i+1)^{th}$ PRB according to an equation $N_{i+1}=N_i+s_i$, in accordance with the position $N_1$ of the first PRB and the interval $s_i$, wherein $N_i$ is the position of the $i^{th}$ PRB.

6. The base station of claim 5, wherein the processor determining the position N1 of the first PRB among the M PRBs according to the cell identifier is configured to acquire a frequency domain offset value between the position $N_1$ of the first PRB among the M PRBs in the current sub-frame and the position of the first PRB occupied by the broadcast channel of the first sub-frame; determine the position of the first PRB occupied by the broadcast channel of the first sub-frame according to the cell identifier; and determine the position $N_1$ of the first PRB among the M PRBs in the current sub-frame according to the frequency domain offset value and the position of the first PRB occupied by the broadcast channel of the first sub-frame.

7. The base station of claim 6, wherein the processor acquiring the frequency domain offset is configured to acquire the frequency domain offset value from the position information, wherein the position information further comprises the frequency domain offset value; or, determine the frequency domain offset value according to the cell identifier.

8. The base station of claim 5, wherein the processor mapping the broadcast channel on the resource position is configured to adopt a mapping manner matched with a demodulation reference signal (DMRS) rate to map the broadcast channel in the M PRBs according to a sequence of first frequency domain and then time domain or a sequence of first time domain and then frequency domain.

9. The base station of claim 5, wherein the processor mapping the broadcast channel on the resource position-is configured to map the broadcast channel and a pilot carrier in each PRB among the M PRBs, and the pilot carrier does not comprise channel-state information reference signal (CSI-RS), common reference signal (CRS) or position reference signal (PRS).

10. A user equipment, comprising:
a processor, configured to determine a resource position of a broadcast channel, wherein the broadcast channel occupies M physical resource blocks (PRBs) among m PRBs of a frequency band center of a carrier, m and M are positive integers, M is not greater than m, and m is not less than the number of the PRBs corresponding to the system bandwidth; and
a receiver, configured to receive a broadcast message sent by a base station through the broadcast channel, wherein the processor determining the resource position of the broadcast channel is configured to determine the positions of the M PRBs according to the position information of the broadcast channel, wherein the position information comprises a cell identifier, the position information further comprises an interval $s_i$ between the $(i+1)^{th}$ PRB and the $i^{th}$ PRB among the M PRBs, wherein i is a positive integer, and i is not smaller than 1 and is not greater than M−1;

wherein the processor determining the positions of the M PRBs according to the position information of the broadcast channel is configured to determine the position $N_1$ of the first PRB among the M PRBs according to the cell identifier, and determine the position $N_{i+1}$ of the $(i+1)^{th}$ PRB according to an equation $N_{i+1}=N_i+s_i$, in accordance with the position $N_1$ of the first PRB and the interval $s_i$, wherein $N_i$ is the position of the $i^{th}$ PRB.

11. The user equipment of claim 10,
wherein the receiver receiving the broadcast message sent by the base station through the broadcast channel on the resource position of the broadcast channel is configured to receive the broadcast message sent by the base station through the broadcast channel on the M PRBs, wherein each PRB among the M PRBs is used by the base station for mapping the broadcast channel and a pilot carrier, wherein the pilot carrier does not comprise channel-state information reference signal (CSI-RS), common reference signal (CRS) or position reference signal (PRS).

* * * * *